Jan. 8, 1929.
O. M. DECKER
1,697,970
CABLE GUIDE AND TRACK GUARD FOR TRACTORS
Filed March 24, 1927
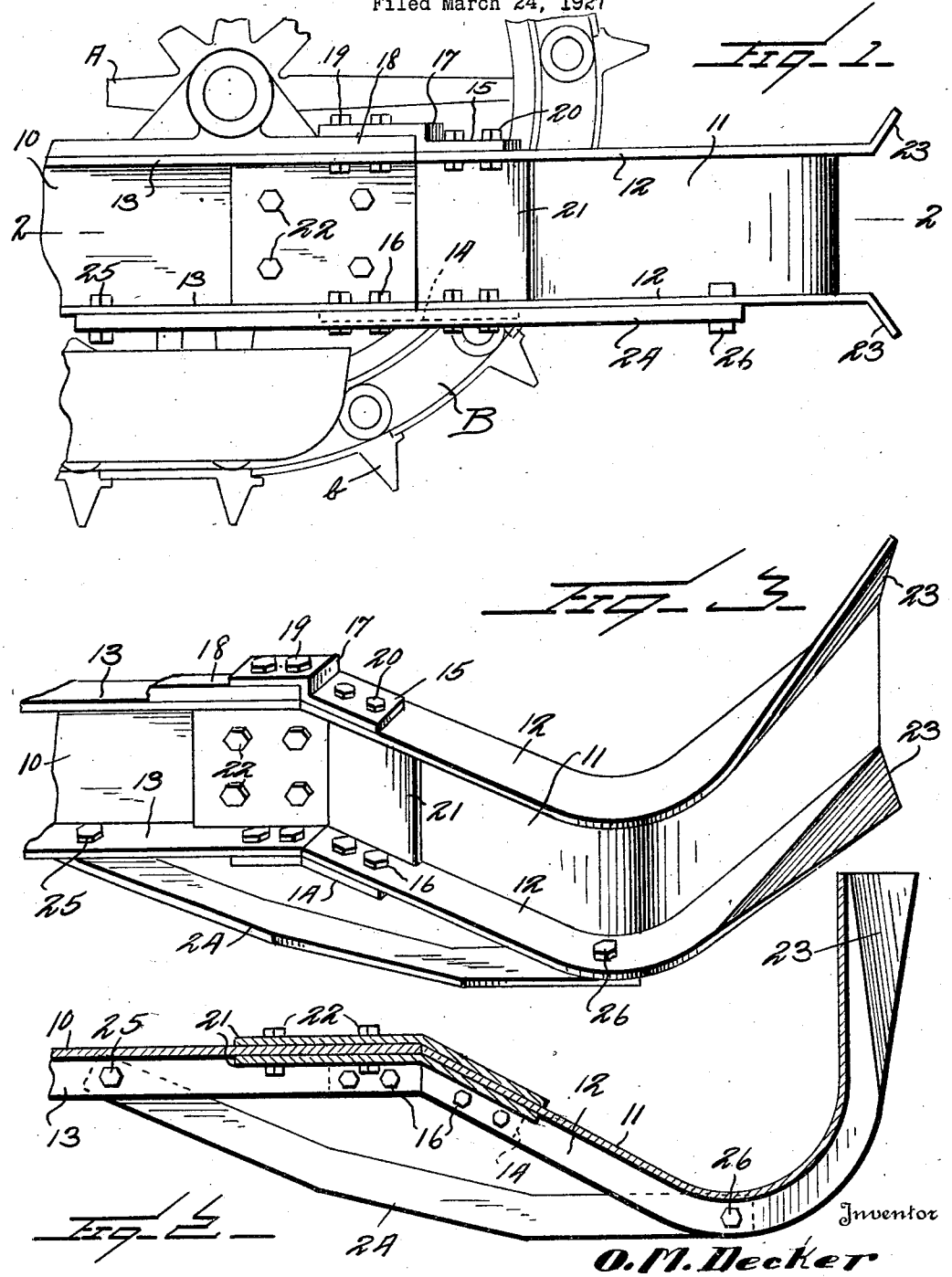

Patented Jan. 8, 1929.

1,697,970

UNITED STATES PATENT OFFICE.

OTIS M. DECKER, OF McPHERSON, KANSAS.

CABLE GUIDE AND TRACK GUARD FOR TRACTORS.

Application filed March 24, 1927. Serial No. 178,048.

This invention relates to an attachment for tractors having endless tracks and driving means engaged therewith and the purpose of the attachment is to provide means for preventing the draft cable of such a tractor from becoming entangled in the endless track of the tractor when the tractor is turned.

A further object is to provide a very simple device of this character comprising channels attached to the frame of the tractor on each side of the rear wheels thereof, these channels or guides extending around the treads of the tractor at the rear thereof so that when the tractor is turned, the channels will engage the draft cable and support it clear of the treads of the endless element constituting the tractor track.

My invention is illustrated in the accompanying drawings wherein:—

Figure 1 is a side elevation of the rear end of a tractor with my attachment applied thereto;

Fig. 2 is a longitudinal sectional view of my attachment and part of the tractor;

Fig. 3 is a perspective view of my attachment and part of the tractor.

Referring to these drawings 10 designates a channel iron which constitutes part of the framework of the tractor and extends longitudinally from a point below and in front of the front wheel to a point below the axis of the rear wheel A. The rear wheel A is supported in bearings upon this channel beam 10. Of course, the rear wheel carries the endless element B which has the treads b. There is one of these beams 10 disposed on each side of the tractor to support the wheels on that side. When tractors of the character described are used for hauling or other draft purposes, the hauling cable is attached to the draft bar of the tractor and when the tractor is turned upon itself, this cable is swung around beneath or into engagement with the endless element or track of the tractor and is very liable to become entangled therewith. My attachment comprises an angularly bent channel iron 11 having the upper and lower flanges 12. The inner end of this channel iron 11 butts against the rear end of the channel iron 10 and the flanges 12 butt against the flanges 13. The channel iron 11 or guard is extended outward at an angle of about 45° to the beam 10 and then bent rearward and then laterally inward so that the rear end of the channel iron 11 extends transversely to the longitudinal axis of the machine. The guard 11 is held in engagement with the beam 10 by means of the fish plates 14 and 15 which are applied to the exterior faces of the flanges 12. The fish plate 14 is angularly bent and is entirely disposed in one plane and is held to the lower flanges 12 and 13 by the bolts 16. The fish plate 15, however, is not disposed in one plane but has its inner end offset or, in other words, this fish plate is angularly bent at 17 so that the inner end of the fish plate 15 accommodates the longitudinally extending beam 18 which forms part of the tractor frame. Bolts 19 pass through this member 18 and through the upper flange of the beam 10 and the outer end of the fish plate 15 is held to the upper flange 12 by means of the bolts 20.

Disposed on opposite sides or faces of the web of beam 10 and the web of the channel iron 11 or guide, are the angular plates 21 which, of course, extend across the joint between the beam 10 and the guide and guard 11 and these plates are bolted to the web of beam 10 by means of the bolts 22 and welded to guard 11. Preferably the outer ends of the flanges 12 are widened gradually, as at 23, and outwardly flared so as to form a guide to guide the cable into the channel. As a further brace for the guide and guard 11 to prevent the strain on the cable from bending it inward, I provide the angular brace 24 which, generally speaking, is outwardly bowed, and is bolted at 25 to the lower flange 13 of beam 10 and at 26 to the lower flange 12 of the channel iron 11.

It will be understood that this guard, as described, is duplicated on opposite sides of the tractor at the rear end thereof, and that it extends around and across the face of the tread of the track, as shown in Figure 1. It is obvious that the tractor may be turned in either direction and that the draft cable under these circumstances will be engaged by the guard and guide 11 and held out of contact with the tractor track, thus permitting a driver to turn the tractor without having the cable tangle up in the track, which is particularly convenient when the tractor is turning at the end of the round. The guards or guides 11 are so made that each guard can be used on either side of the tractor. The fish plate 15, however, is not reversible but must be fitted to the side on which it is designed to be used. The channel 11 is of 7" channel steel, the same as the frame of the caterpillar.

Actual practice has shown that this device permits the driver to make as short a turn with the tractor as he pleases and may indeed whirl the tractor around, so to speak, on one wheel without any danger of entangling the cable with the track or with the lugs thereof. Obviously minor variations will be made in order to fit this device to different forms of tractors and such variations are within the scope of the invention as defined in the appended claims.

I claim:—

1. The combination with a tractor having rear driving wheels and an endless track, of cable guides and guards each attached to the frame of the tractor at the rear ends thereof one on each side of the tractor and extending to a point rearward of the rearmost portion of the corresponding track and then extending toward the middle of the tractor and each consisting of a channel iron, the flanges at the inner end being flared, said guides and guards having their inner ends spaced from each other.

2. The combination with a tractor having a frame including longitudinally extending flanged beams, and driving elements at the rear of said beams, of cable guides and guards, each consisting of a channel iron section angularly bent and each having its inner end butted against the rear end of said beam and each extending rearward of the driving element on that side and then extending toward the middle of the tractor, and fish plates riveted to the flanges of the beam and the flanges of the guard and holding the guard rigidly to the beam, the inner ends of the guides and guards being spaced from each other at the middle of the tractor to permit the passage of draft means between said inner ends.

3. The combination with a tractor having a frame including longitudinally extending flanged beams on each side of the tractor and a rear driving element extending rearward of the rear ends of said beams, of cable guides and guards disposed one on each side of the tractor at the rear thereof, each guide consisting of a section of channel iron butted against the end of the corresponding frame beam and rigidly engaged therewith, the channel iron extending laterally outward and rearward and then rearward and laterally toward the middle of the tractor, the inner ends of the guides and guards being spaced from each other to permit the passage of a draft element.

4. The combination with a tractor having a frame including longitudinally extending flanged beams on each side of the tractor and a rear driving element extending rearward of the rear ends of said beams, of cable guides and guards, each guide consisting of a section of channel iron butted against the end of the beam and rigidly engaged therewith, the channel iron extending outward and rearward and then rearward and laterally toward the middle of the tractor, the extremities of the flanges of the channel iron being flared.

5. The combination with a tractor having a frame including longitudinally extending flanged beams on each side of the tractor and a rear driving element extending rearward of the rear ends of said beams, of cable guides and guards, each guide consisting of a section of channel iron butted against the end of the beam and rigidly engaged therewith, the channel iron extending outward and rearward and then rearward and laterally toward the middle of the tractor, and an outwardly bowed brace connecting the lower flange of the beam to the lower flange of the channel iron guide.

6. The combination with a tractor having rear driving elements of a cable guide and guard comprising channel iron sections having laterally and outwardly projecting flanges, the sections being attached to the tractor at the sides thereof and extending outward laterally beyond the plane of said sides and then rearwardly and transversely inward toward the middle of the tractor rearward of the driving elements, the inner end of the guide and guard on one side of the tractor being spaced from the guide and guard on the other side of the tractor to permit the passage of draft means between said inner ends.

In testimony whereof I hereunto affix my signature.

OTIS M. DECKER.